(12) United States Patent (10) Patent No.: US 9,992,762 B2
Graziano (45) Date of Patent: *Jun. 5, 2018

(54) REVERSE PATH COMMUNICATION SYSTEM

(71) Applicant: James Michael Graziano, Hotchkiss, CO (US)

(72) Inventor: James Michael Graziano, Hotchkiss, CO (US)

(*) Notice: Subject to any disclaimer, the term of this patent is extended or adjusted under 35 U.S.C. 154(b) by 21 days.

This patent is subject to a terminal disclaimer.

(21) Appl. No.: 15/142,374

(22) Filed: Apr. 29, 2016

(65) Prior Publication Data

US 2016/0242145 A1 Aug. 18, 2016

Related U.S. Application Data

(63) Continuation-in-part of application No. 12/675,356, filed on Feb. 25, 2010, now Pat. No. 9,355,416.

(51) Int. Cl.
| | |
|---|---|
| *H04W 72/00* | (2009.01) |
| *H04W 72/04* | (2009.01) |
| *H04N 21/6405* | (2011.01) |
| *H04N 21/6587* | (2011.01) |
| *G06Q 30/02* | (2012.01) |
| *G06Q 30/04* | (2012.01) |

(Continued)

(52) U.S. Cl.
CPC .......... *H04W 72/005* (2013.01); *G06Q 10/06* (2013.01); *G06Q 10/101* (2013.01); *G06Q 30/02* (2013.01); *G06Q 30/04* (2013.01); *H04N 7/17327* (2013.01); *H04N 21/252* (2013.01); *H04N 21/25808* (2013.01); *H04N 21/42202* (2013.01); *H04N 21/475* (2013.01); *H04N 21/6112* (2013.01); *H04N 21/6162* (2013.01); *H04N 21/6405* (2013.01); *H04N 21/6587* (2013.01); *H04N 21/854* (2013.01); *H04W 72/042* (2013.01); *H04W 72/0413* (2013.01); *H04N 21/41407* (2013.01); *H04N 21/6131* (2013.01); *H04N 21/6181* (2013.01)

(58) Field of Classification Search
CPC .......... H04W 72/005; H04W 72/0413; H04W 72/042; H04N 21/252; H04N 21/25808; H04N 21/475; H04N 21/854; H04N 21/6587

See application file for complete search history.

(56) References Cited

U.S. PATENT DOCUMENTS

| | | | | |
|---|---|---|---|---|
| 2002/0057670 | A1* | 5/2002 | Kerns | H04Q 11/0478 370/352 |
| 2006/0099981 | A1* | 5/2006 | McKenna | H04W 4/08 455/508 |
| 2009/0165895 | A1* | 7/2009 | Ushigami | B21B 3/02 148/208 |

* cited by examiner

*Primary Examiner* — Ian N Moore
*Assistant Examiner* — Mewale Ambaye

(57) ABSTRACT

The Reverse Path Communication System architecture enables end user devices to share a common wireless forward path of a multicast communication architecture in which the forward path delivered content is dynamically changed or modified based on a real-time, near-real-time, or delay-time basis via aggregated reverse path feedback from at least one of a plurality of end user devices. The Reverse Path Communication System periodically or continuously aggregates the feedback input received via the reverse path (having wired and/or wireless connectivity), modifies the forward path multi-media content, and delivers this dynamically modified multi-media content to the then connected population of end user devices via a wireless forward path multicast in a repetitive closed loop fashion.

6 Claims, 10 Drawing Sheets

(51) Int. Cl.
*H04N 7/173* (2011.01)
*H04N 21/25* (2011.01)
*H04N 21/258* (2011.01)
*H04N 21/422* (2011.01)
*H04N 21/475* (2011.01)
*H04N 21/854* (2011.01)
*G06Q 10/06* (2012.01)
*G06Q 10/10* (2012.01)
*H04N 21/61* (2011.01)
*H04N 21/414* (2011.01)

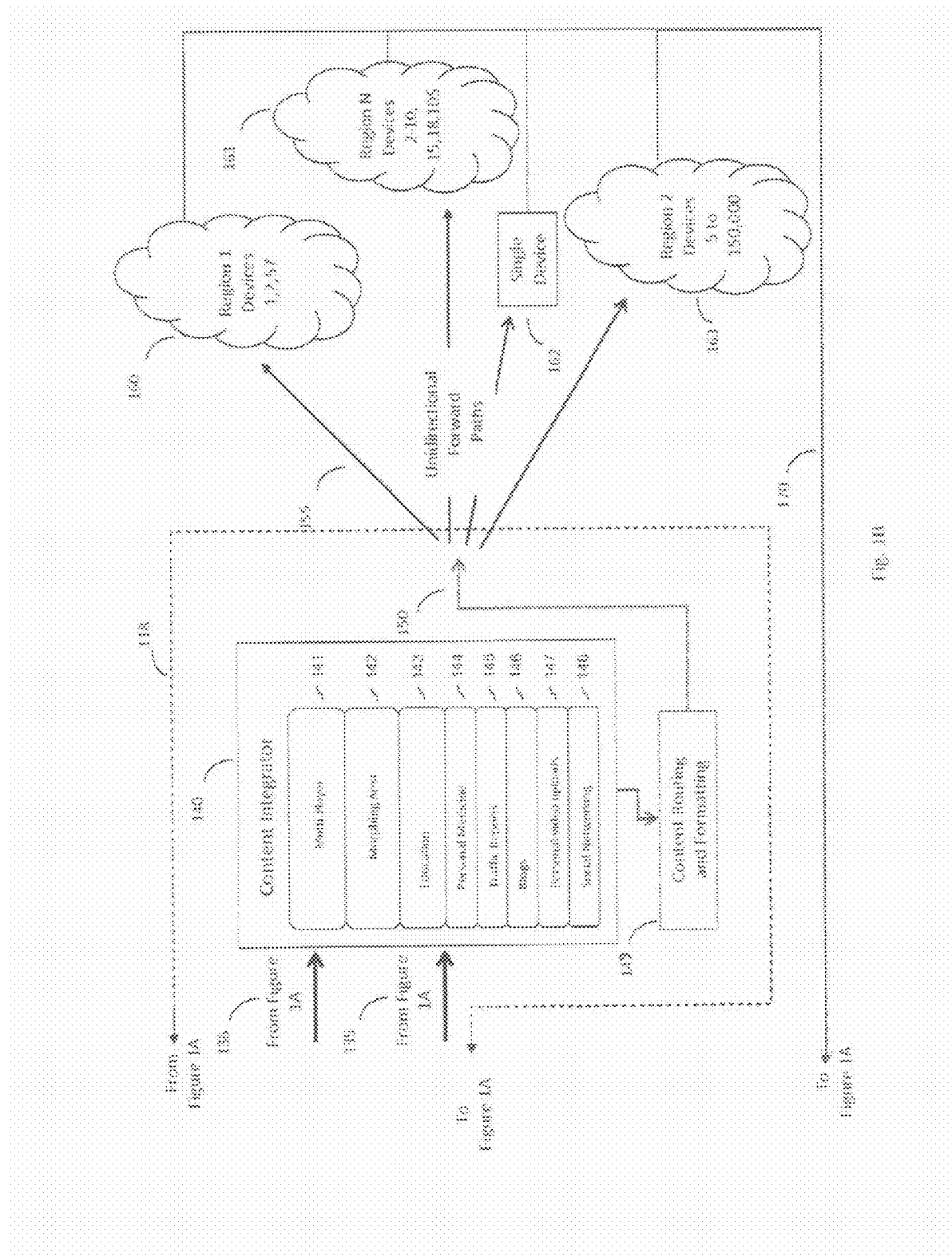

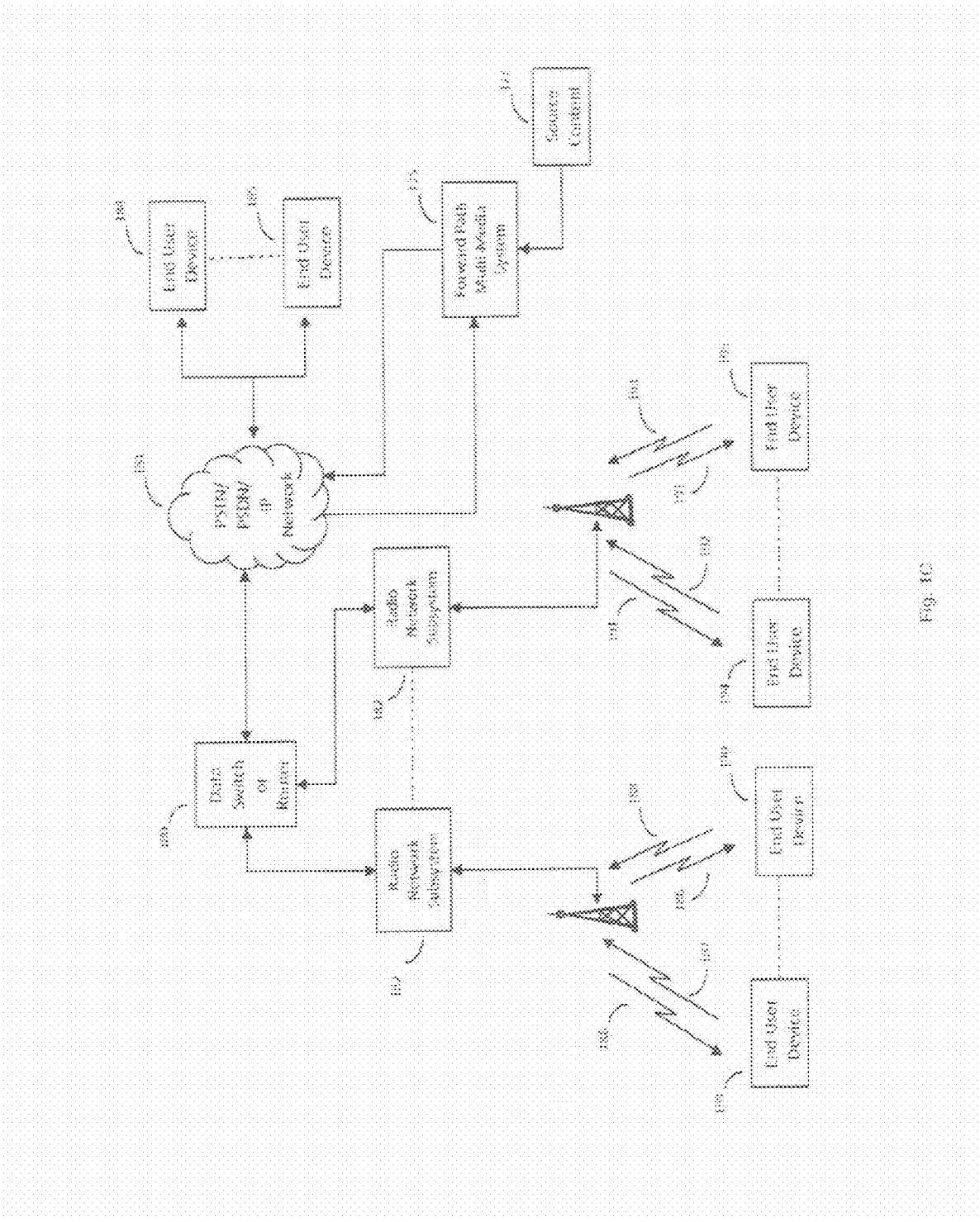

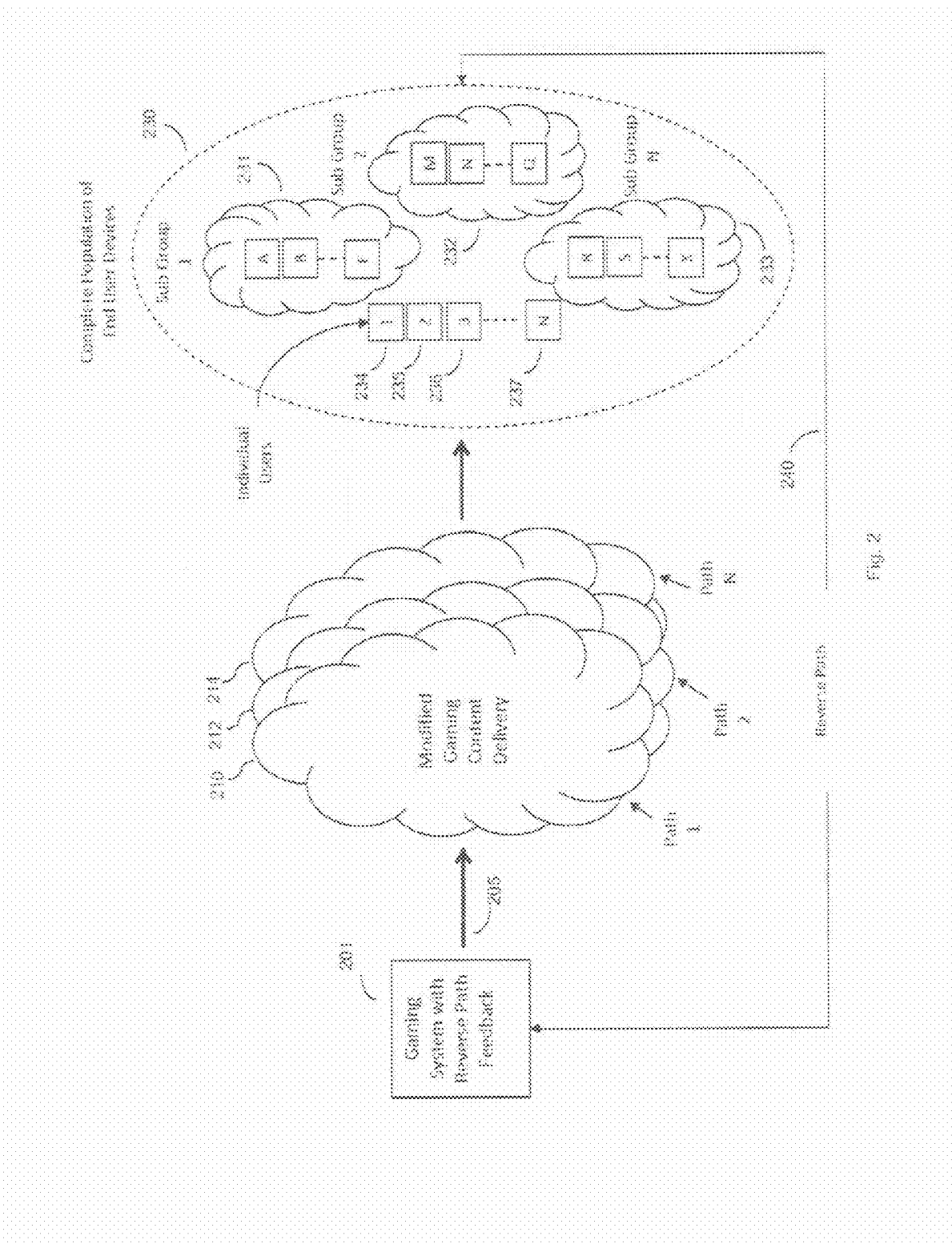

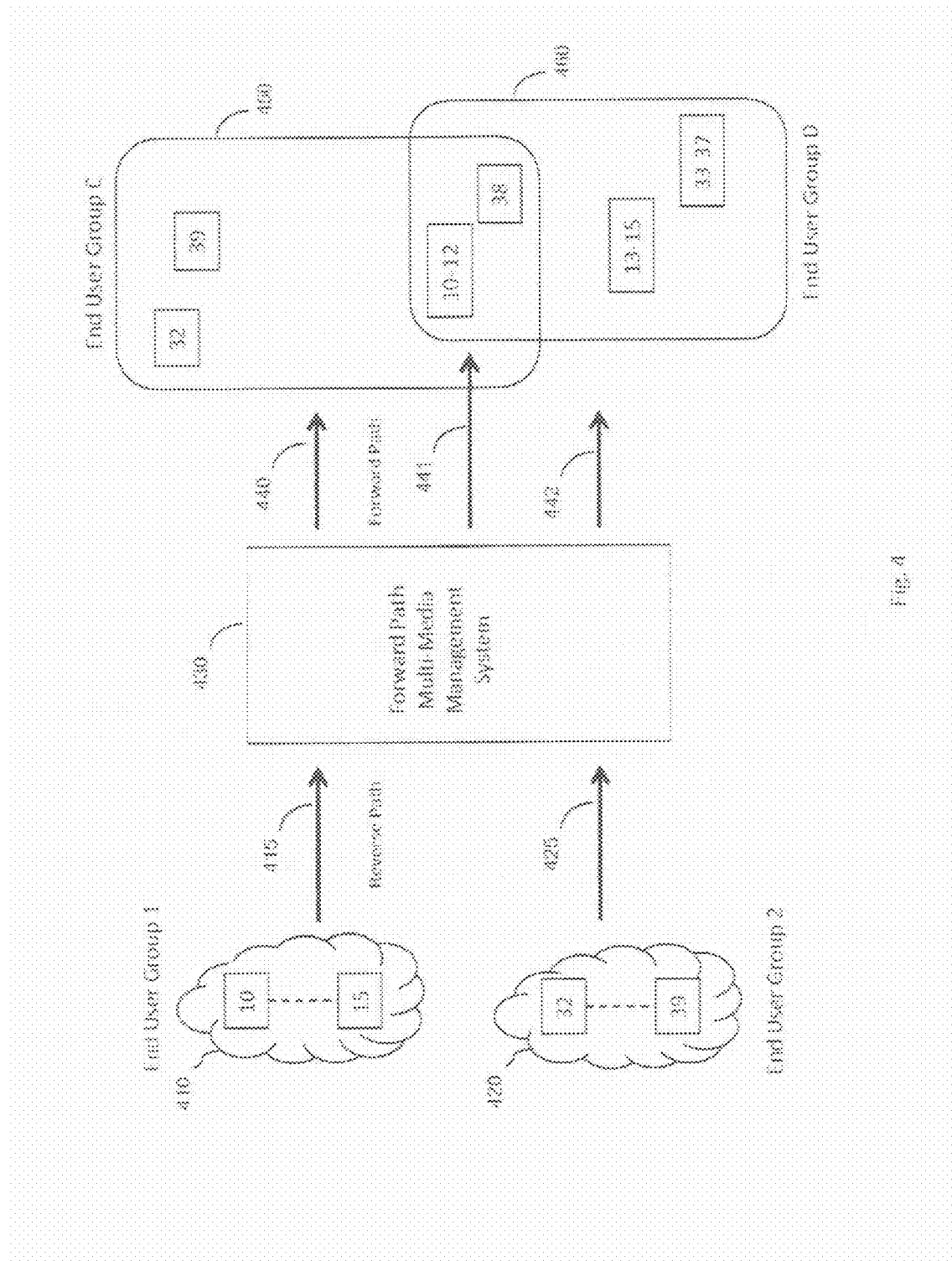

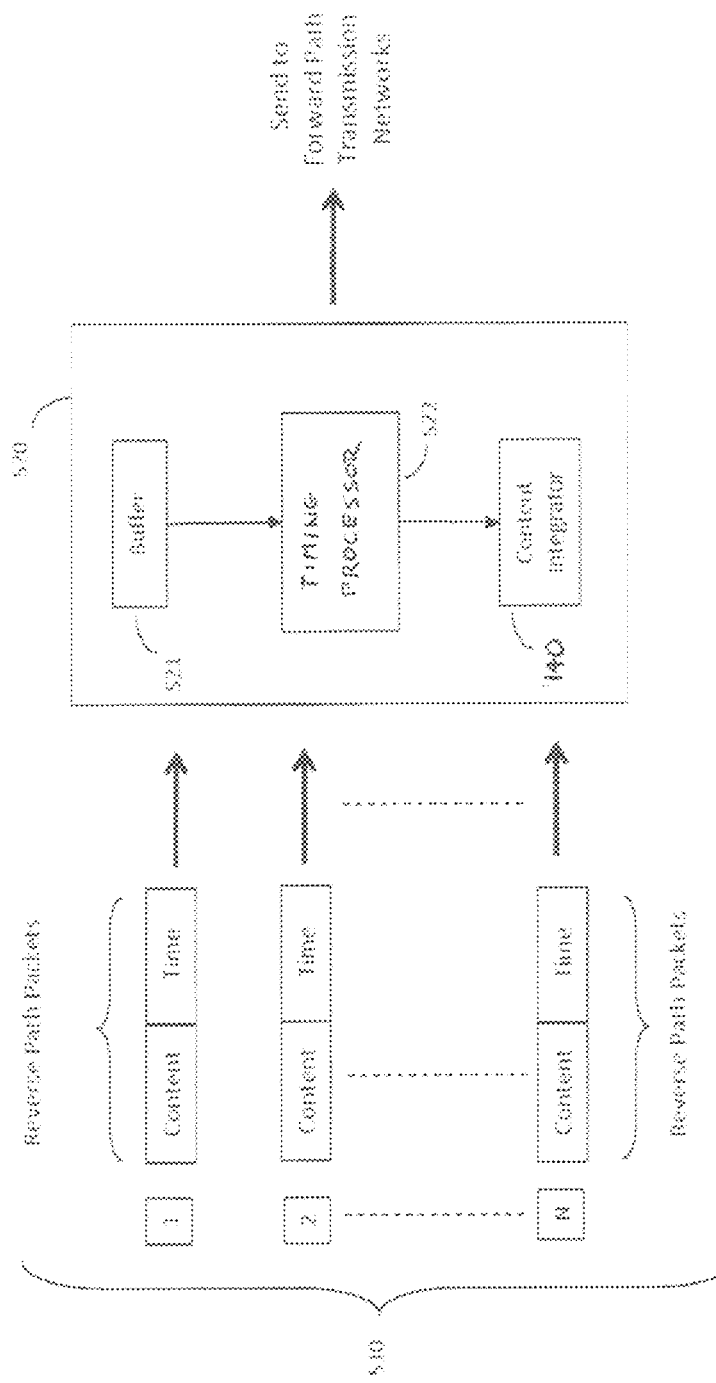

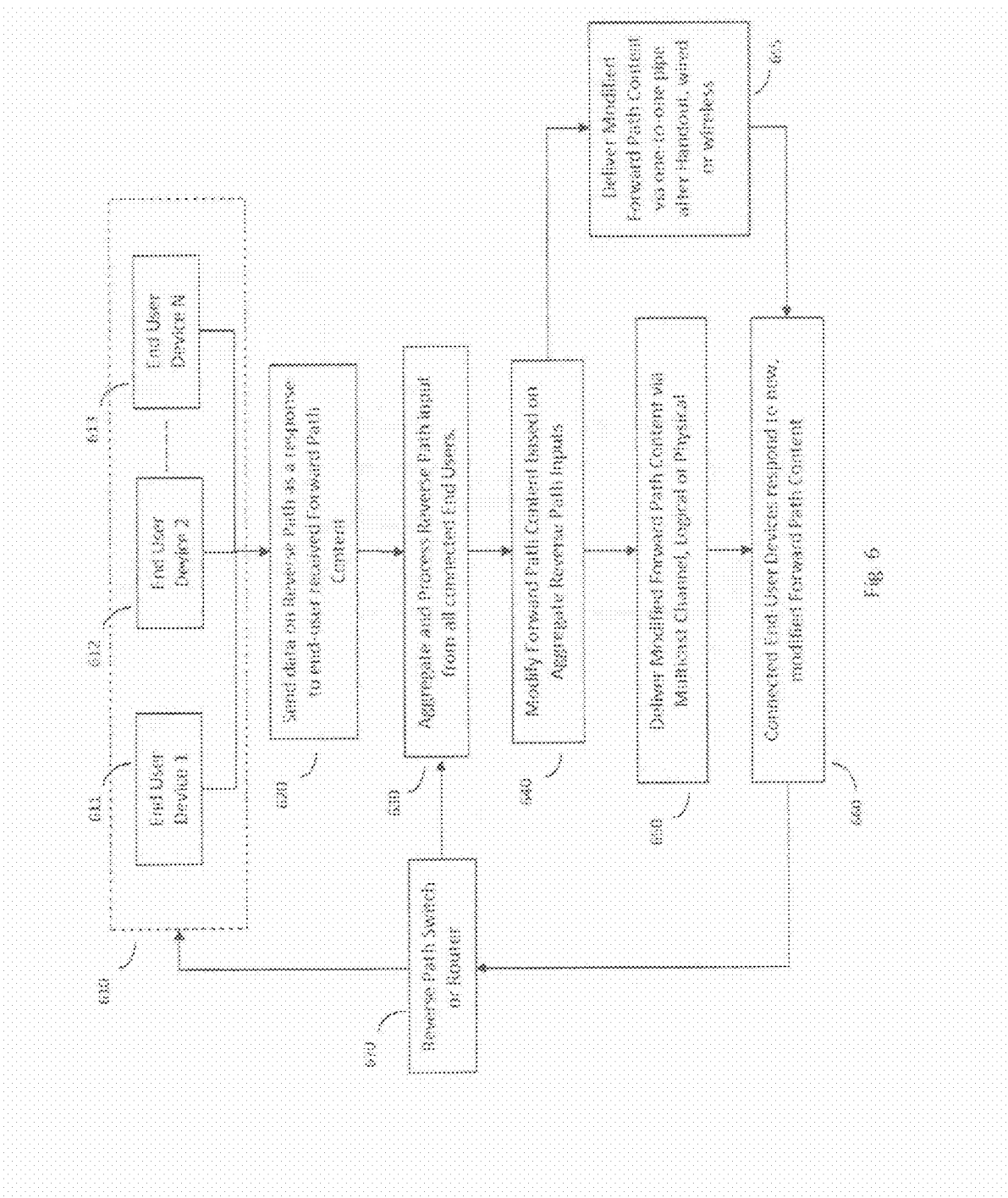

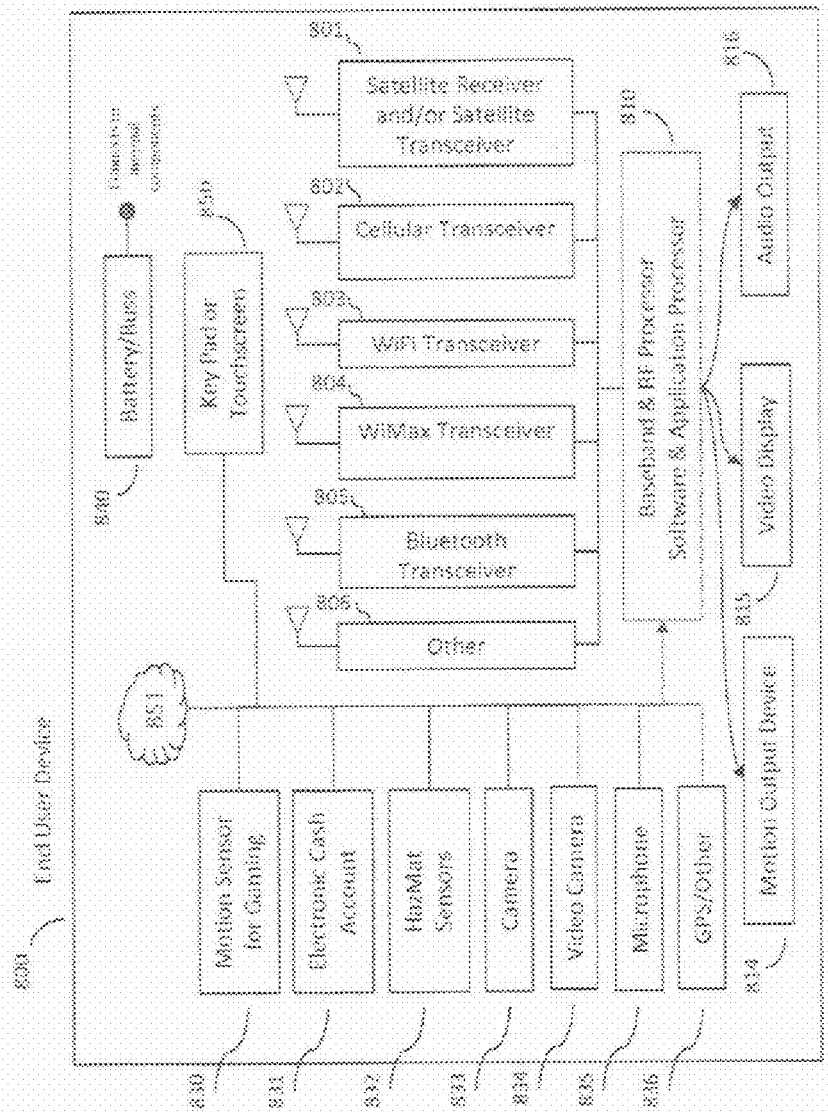

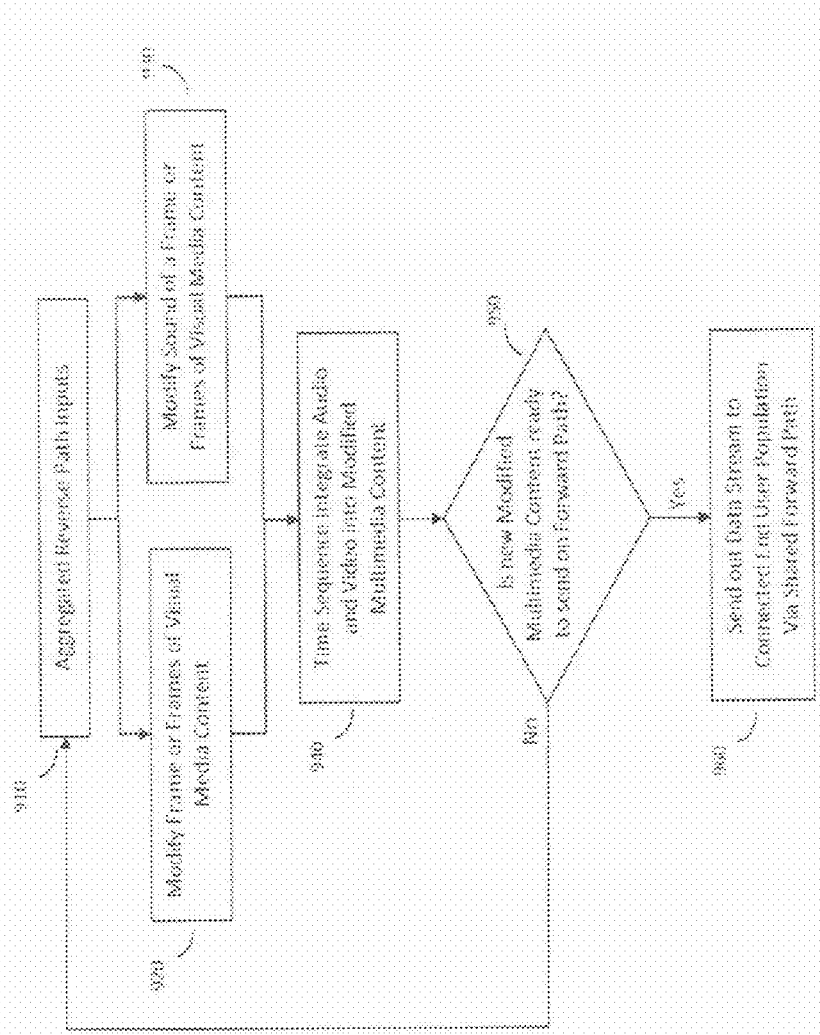

REVERSE PATH COMMUNICATION SYSTEM

CROSS-REFERENCES TO RELATED APPLICATIONS

This application is a Continuation-In-Part of U.S. patent application Ser. No. 12/675,356 filed Feb. 25, 2010 and U.S. patent application Ser. No. 12/675,349, filed Feb. 25, 2010, and are hereby incorporated by reference to the same extent as though fully disclosed herein.

FIELD OF THE INVENTION

This invention relates to a Reverse Path Communication System which enables feedback via the reverse path (end user device to network direction) from at least one of a plurality of end users who are capable of influencing, modifying, or changing the delivered multi-media content in the forward path (network to end user device direction) being delivered via a wireless multicast communication network and also processing requests from the end users to purchase goods or services identified in the forward path content.

BACKGROUND OF THE INVENTION

Multi-media content such as video, music, and data is delivered in a well-known fashion via wired or wireless networks to end user devices such as HDTVs, music playback systems, and portable mobile devices. These networks each have unique characteristics of speed, efficiency, reliability, availability, and capacity. For example, satellite is more efficient for large geographic regions but suffers from diminished content distinction from one region to the next; that is, there is minimal content diversity, and it is expensive and difficult to do high granularity regional or demographic content targeting in a satellite architecture. In contrast, cable TV has regional and neighborhood targeting attributes but is often bandwidth or capacity constrained, thereby limiting the number of high bandwidth HDTV signals it can carry.

What is needed is a network architecture that combines the two strengths of targeting and capacity. An architectural advantage of terrestrial wireless networks is high capacity and targeted delivery. A terrestrial wireless network can deliver multi-media content to more than one end user or subscriber at the same time, thereby realizing high levels of network efficiency. The terrestrial wireless network delivery method is called broadcast, multicast, or narrowcast and has multiple end users (subscribers) and their associated end user devices receiving the broadcasted content, and thereby derives its high efficiency when more than one end user receives the same content in a simultaneous fashion.

Wireless multicast service facilitates the sharing of a single air interface channel by multiple end users. The single wireless air interface channel, whether logical or physical, extends from the base station radio transmitter in the wireless communication network to a subscriber's wireless end user device, wherein the single wireless air interface channel comprises the forward path (network to end user device direction) that carries the multicast multi-media content. A plurality of end user devices thereby concurrently receive the multi-media content on the same forward path channel. While the multicast process is well taught in the art, the delivered multi-media content, information, or data (collectively termed "content" or "multi-media content" herein) is static in nature and is simply a replica of the source content. The wirelessly multicast source content is immutable and does not have end user interaction or feedback.

New wireless multi-media content delivery architectures, such as MediaFLO ("Media ForwardLinkOnly") and DVB-H (Digital Video Broadcast-Handheld), function by using a broadcast architecture in the forward path to produce a pseudo-multicast delivery and concurrently disseminates multi-media content to a plurality of wireless end user devices on a single air interface channel. In these architectures (also termed "multicast" herein), a unidirectional multi-media wireless broadcast network transmits multi-media content to selected authorized wireless end user devices in a time concurrent fashion. However, there is no interconnection, interaction, or feedback between the end users and their associated end user devices with this multi-casted multi-media content stream. The forward path content is completely and totally static in its nature. The delivered multi-media content is essentially no different than UHF or VHF broadcasted television, other than it can be received on small portable digital devices.

The MediaFLO and DVB-H multi-media wireless architectures, therefore, are static in their user interface, since there is no interactivity or feedback between delivered multi-media content and the end user. The multi-casted content is invariant or immutable in its extent. That is, whatever is delivered to the wireless network for transmission to the end user population is delivered as an exact replica, untouched and unmodified from its original form. This is a distinct and inherent limitation of the present wireless multicasting art (even though multicasting is efficient and targeted).

The existing wireless multicasting art does not enable or permit end users, via their associated end user devices, to modify the multi-media content carried on the forward path in any manner. Still, there are numerous applications wherein the ability to modify the forward path multicast content based on end user (subscriber) input or actions would be highly desired. What is needed is a novel adaptation of a wireless multicast network that enables end user interaction and modification of the forward path delivered multi-media content. In this new architecture, the end user population would have an unprecedented ability to communicate data and knowledge via the reverse path, a capability heretofore unavailable.

Thus, the state of the wireless multicasting art does not enable the capability to dynamically modify the content delivered on the forward path via aggregated feedback or input from at least one of a plurality of end users via their associated end user devices. No system heretofore has envisioned engaging the end user to directly and actively influence the delivered multi-casted content.

BRIEF SUMMARY OF THE INVENTION

An advance is realized over the present wireless multi-casting art by the present Reverse Path Communication System, which enables a reverse path feedback architecture, wherein the forward path multi-casted content can be dynamically modified as a result of end user interaction or feedback and requests can be transmitted from the end user devices on the reverse path. In the Reverse Path Communication System architecture, end user devices share a common wireless forward path of a multicast communication architecture in which the forward path delivered content is dynamically changed or modified based on a real-time, near-real-time, or delay-time basis via aggregated reverse path feedback from at least one of a plurality of end user devices. The Reverse Path Communication System periodically or continuously aggregates the feedback inputs received via the reverse path (having wired and/or wireless connectivity), modifies the forward path multi-media content, and delivers this dynamically modified multi-media content to the then connected population of end user devices via a wireless forward path multicast in a repetitive closed loop fashion. Alternatively or in addition, the end user population would have an unprecedented ability to communicate data and knowledge via the reverse path, a capability heretofore unavailable. The scope and diversity of these end user driven applications, while virtually unlimited, include: multiplayer gaming, emergency events, education, medicine, live sporting events, automobile traffic congestion reports, and the like.

The Reverse Path Communication System aggregates the reverse path feedback from the end user device or devices and then processes this feedback data in context with the streamed forward path content. For example, if the application is a multiplayer game, the Reverse Path Communication System receives the end user's reverse path feedback data which defines how their avatar or in-game virtual person should react or behave at a given point within the game. This feedback is sent to the Reverse Path Communication System via wired or wireless means. The Reverse Path Communication System, in this gaming example, aggregates and delivers the "combined feedback" of all the connected end users for that moment in time to the gaming software application. The gaming software application then modifies its streamed forward path content according to the latest "combined feedback". The wireless multicast network then delivers the latest video frames or sequence of successive game image frames of the game session (to include sound) to the participating end users based on the "combined feedback". The wireless multicast can be delivery targeted to regionally or locally grouped end user sub-populations to enhance the overall network efficiency. This process repeats in a continuous fashion, with continuous N+1 events of "combined feedback" delivered to the software application, which in turn modifies the streamed forward path content.

In addition, the Reverse Path Communication System enables the subscriber to receive the multicast or Media-FLO/DVB-H broadcast on their wireless subscriber device via the forward path of a multicast/broadcast channel, concurrently with a plurality of other subscribers on the same multicast/broadcast channel, and simultaneously initiate a unique transaction to purchase goods and/or services or to move information via the reverse path associated with the shared multicast channel or over a reverse path on an associated cellular network, respectively. Typically, goods and/or services are offered to the subscriber as part of the multicast/broadcast extant on the shared forward channel and the individual subscribers receiving the shared multicast/broadcast can elect to purchase the offered goods and/or services by activating a response message that is transmitted over the reverse path, indicating the subscriber's desire to initiate a transaction. The subscriber is uniquely identified as part of the registration process, and can communicate with the Reverse Path Communication System via the reverse path of the multicast channel, in a secure, subscriber specific manner. This enables the subscriber to signal the Reverse Path Communication System of their desire to initiate a transaction by signaling on the reverse path of the multicast channel, yet not have to disconnect from the multicast channel and originate a separate point-to-point communication connection from the wireless subscriber device to the point-of-sale server to initiate and effect a transaction, as is required in existing systems.

End users in the Reverse Path Communication System can be grouped via location or region, together with personal attributes such as demographic, socio-graphic, or psycho-graphic interests as it relates to a given multi-casted content stream. The pairing of physical location groupings with personal interest attributes enables new and novel telecommunication services with the attendant advantage of extremely efficient delivery. The wireless communication network's capacity utilization, both in terms of assets and spectrum, is very high.

For example, the Reverse Path Communication System is ideally suited to blogging and social networking. In a social networking application, personal devices such as a cell phone with cellular or WiFi or WiMax connectivity are now capable of connecting to a social network with extremely high efficiency since the forward path link, which is generally more bandwidth intensive, is shared as a "grouped multicast". The social network can be specifically targeted as a given demographic, socio-graphic, or psychographic interest group. Social networks are often a "thin-thick pipe" in their networking requirements. That is, the reverse path data from any given end user is less bandwidth intensive, but the streamed content back to the population of end users in a given social network is generally more bandwidth intensive. Thus, social networks ideally fit the networking profile of the present Reverse Path Communication System.

In the Reverse Path Communication System architecture, the reverse path fend user to network direction) can be wired or wireless. Thus, the reverse path has flexibility in terms of its connectivity as well as the relative speed of its connection. For instance, a computer connected to a home or office LAN can use their personal LAN network for reverse path connectivity to the Reverse Path Communication System. However, to realize the forward path efficiencies of concurrent delivery of the streamed content, the computer also has the ability to wirelessly receive the concurrent forward path for its sub-population geographic grouping via cellular, WiFi, WiMax, MediaFLO, DVB-H, or some other wireless means. Alternatively, if the reverse path is wireless only, the end user device could use the same network as the forward path stream, such as in a WiFi or WiMax network; or it could be a hybrid of WiFi or cellular in the reverse path and MediaFLO in the forward path. The end user device could be a PC, a PDA, a cell phone, or some specialized device like a video game controller. Thus, the Reverse Path Communication System architecture is not limited to any one configuration.

The Reverse Path Communication System solves a complex problem resident in existing telecommunication architectures by combining reverse path feedback with forward path multicasting in numerous novel ways to achieve high delivery efficiency, high subscriber targeting, and continuous content modification ensuring high relevancy.

BRIEF DESCRIPTION OF THE DRAWINGS

FIGS. 1A and 1B illustrate, in block diagram form, the overall architecture of a typical Reverse Path Communication System;

FIG. 1C illustrates an example physical wireless network with reverse path modification of the forward path;

FIG. 2 illustrates the interrelationship between a series of forward path multicasts and sub-populations of end users with reverse path feedback;

FIG. 4 illustrates, in block diagram form, where the user groups creating the content can receive their own collective modified content or content from other user groups;

FIG. 5 illustrates, in block diagram form, the time alignment of reverse path data to insure forward path modification accuracy;

FIG. 6 illustrates, in flow diagram form, the macro process steps that the Reverse Path Communication System takes to complete a continuous forward path modification cycle;

FIG. 7 illustrates, in block diagram form, a typical end user device; and

FIG. 8 illustrates, in flow diagram form, the process to modify forward path video and audio based on aggregated reverse path inputs.

DETAILED DESCRIPTION OF THE INVENTION

Philosophy Of The Multicast Wireless Communication System

An exemplary multi-cast technology is described in detail in U.S. Pat. Nos. 6,594,498 and 6,681,115, for example; and this technology can be used to implement narrowcast communications to wireless end user devices where the narrowcast is a highly targeted "multicast" to geographic and/or demographic end user groupings. The term "narrowcast" as used in these patents is considered a form of multicasting.

Forward Path Multi-Media Management Philosophy

Figure 1A:
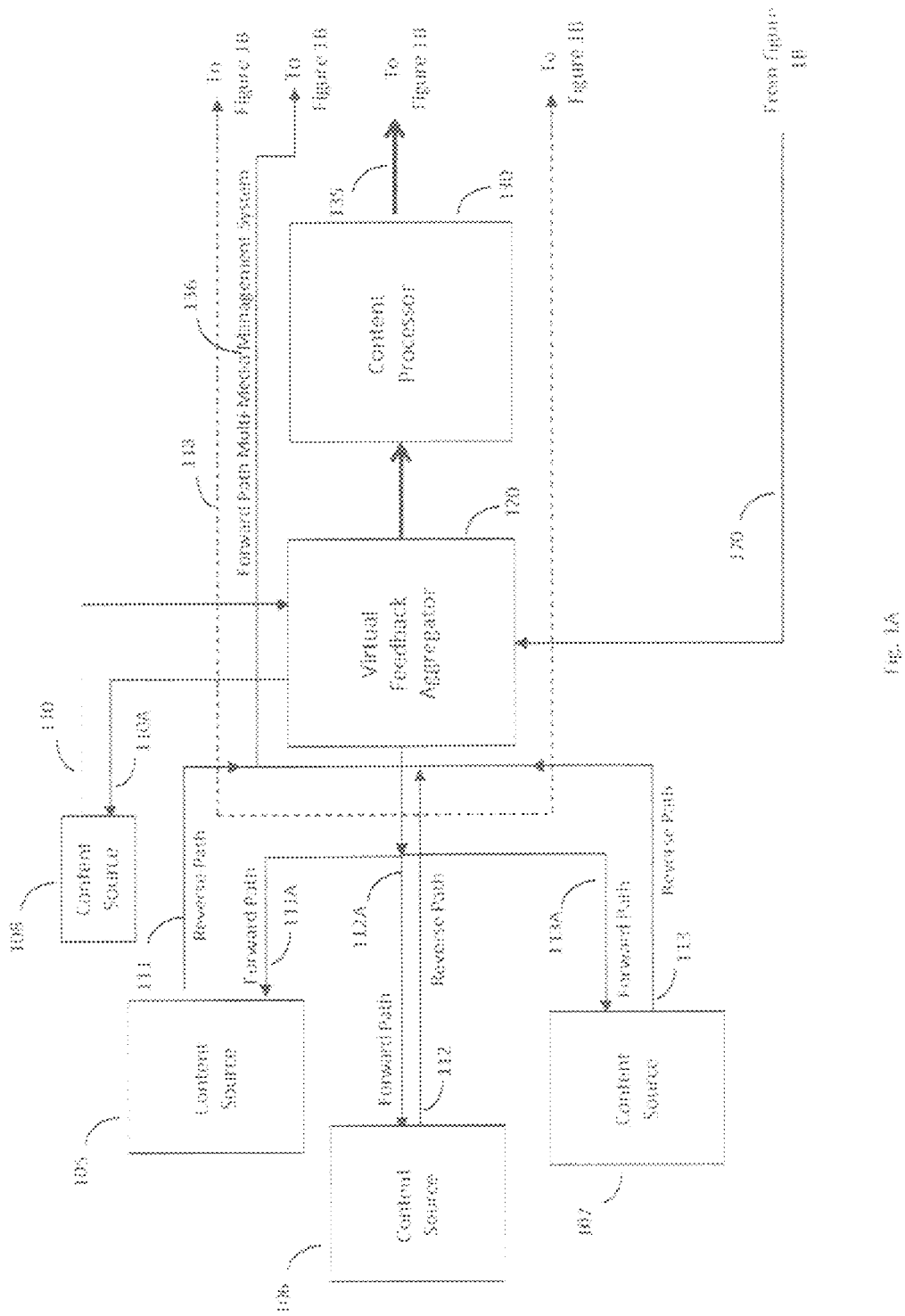

FIGS. 1A and 1B depict a logical or functional description of the Forward Path Multi-Media Management System architecture and show the essential building blocks of the overall system. One key element of this particular architecture is that the content sources are centrally located. FIG. 1C illustrates one physical network embodiment of the system of FIGS. 1A and 1B.

Content sources 105-107 are centrally located and typically sources of broadband multi-media programs that are either generated off-line or dynamically generated on-line. The content could be visual or visual/aural in its extent, or it could take some other form such as machine-to-machine data. This content is of interest to one or more grouped sets of end users (subscribers) on the forward path multicast.

End user devices that receive the content can be grouped by region, locale, or geography as sub-populations 160-163 where sub-population 163 is the Nth sub-population. In aggregate, all of the sub-populations form the "population" of end users. While not shown, these sub-populations could also be formed on the basis of end user attributes such as demographic, psychographic, or socio-graphic attributes; thus, the grouping may be logical and not physical. With this type of attribute matching, the grouping takes the form of a logical group versus a physical group and can be characterized also as a sub-population or population. The attribute grouping could also be paired with a physical grouping such that end users can be both logically and physically grouped to form a multicast sub-population.

The grouping process, be it geographic-, attribute-, or combinatorially-based, is accomplished via methods well understood in the art. To realize geographic grouping, the GPS position can be mapped to a given radii, and all end users within that radii are grouped. For attribute grouping, the end user or subscriber attributes are stored in a database such as a Home Location Register (HLR) if the wireless network is cellular; then all end users with the requisite attributes are logically joined as a group independent of their physical location. Alternatively, both "grouping" methods, geographic and logical attribute, are combined to provide highly targeted delivery, both by location and by needs. Other grouping methodologies are possible, and nothing herein limits how groups are formed. The groups that are defined are used by content routing and formatting element 149 shown on FIG. 1B to activate the network to deliver a particular stream of content to the grouped end user devices and in a format that matches their particular display and function characteristics.

Reverse Path Communication System 118 has three building blocks: Virtual Feedback Aggregator 120 acts as a communication device and buffer to collect and aggregate all of the reverse path information; Content Processor 130 acts as an information processor where software applications reside and process the aggregated inputs from the connected end user devices; and Content Integrator 140 performs the functionality of modifying the selected multi-media content stream. The modification by Content Integrator 140 could be a video frame processor, it could be an audio stream modifier, or it could be both, for example.

Content Processor 130 has algorithms to determine how N reverse path modifier inputs should be collectively assimilated and then sent to Content Integrator 140 for content modification. Content Processor 130 determines how to apply the collective inputs for a given processing step performed in Content Integrator 140. There is at least one resident software application, and there could be multiple software applications concurrently operating. The inputs include, but are not limited to: what region an end user device is in (useful for forming the forward path multicast region); what sensor data the device is sending, such as HazMat information; what the GPS location is of a given device; is there a "user input" such as an action or motion for a gaming application; and so on. In addition, the functionality described can be implemented in varying ways, so the assimilation of the modifier inputs and/or their application to a process for modification of the content stream may differ from that described herein.

Reverse path 170 originating in FIG. 1B and connected to Reverse Path Communication System 118 and internally to Virtual Feedback Aggregator 120 provides a method where end user devices in groupings 160, 161, 162, and 163 communicate data for the modification procedure that ultimately occurs at Content Integrator 140. This completes a continuous processing cycle end-to-end across the Reverse Path Communication System 118.

The Reverse Path Communication System 118 enables the functions of aggregation of reverse path content at Virtual Feedback Aggregator 120. The reverse path content conveyed from content sources 105-108 is comprised of content that is multi-media in nature which is uploaded to the Content Integrator 140 of the Reverse Path Communication System 118. In addition, the Virtual Feedback Aggregator 120 can redirect the reverse path content to external destinations, such as the cloud or content sources 106-108 via paths 110A-113A. For example, the reverse path content received from an end-user device can be stored on an external memory via IP network 181 for later use by the user.

It is anticipated that the preferred embodiment has a feedback loop comprising reverse path 170 as the content modification data link; and paths 110, 111, 112, and 113 are used primarily for content source paths. In addition, the path components 110A-113A, where links 110-114 are bidirectional links, are shown as directly connected to the content sources 105-108 to illustrate how the forward path multimedia content can be modified directly at the content generating content sources 105-108. In this architecture, the content sources 105-108 embody a content processing capability similar to the Reverse Path Communication System 118.

Content Integrator 140 can have a number of applications, and the listed applications in no manner suggest that this is the entire set of applications that the Reverse Path Communication System is capable of implementing. In addition, the applications illustrated herein can be implemented as an integral part of the Reverse Path Communication System 118, or can be sites that are located external to the Reverse Path Communication System 118. These external sites can be existing content generating and processing systems, such as a massively multiplayer role-playing game (MMORPG) which enables players located at diverse locations to form sub-groups, tribes, or armies within the game space.

The applications illustrated in the Reverse Path Communication System 118 are for illustration, and multi-player application 141 is a gaming process that implements multi-player gaming or live multi-party interactive competitions. Morphing Area process 142 uses the received reverse path feedback data to map a geographical locus and region of a physical phenomenon that is detected by a plurality of the end user devices, such as the presence of a BioHazard. Education application 143 represents an education application where a student or students can ask professors questions of a live multi-casted classroom lecture. Personal Medicine application 144 is a multi-party medical feature, such as a support group for cancer. Traffic reporting application 145 uses the feedback received from the end user devices to map road conditions on the various highways that are being traversed by the end users. As part of this, the smart cars can communicate with each other as well as stationary sites to generate alerts for accidents, construction zones, detours etc. They will likely be cell network based and the stationary locations especially will need to narrow cast as may the vehicles themselves. That opens up Reverse Path as a way for the car to communicate back. So a construction zone multicasts it's status to approaching cars and the cars tell the construction zone that they are approaching the construction zone, which updates traffic volume in real time. Blogging application 146 provides the end users with a venue to post blogs. Personal video upload service 147 enables the end users to upload multi-media files for sharing among end users. Social networking application 148 represents any multi-party communication site.

The output of these various services and applications are transmitted to content routing and formatting element 149 for display formatting and routing to end user groups. These outputs are then transmitted via communication path 150 to effect a multicast of the modified content which is transmitted to the end user devices via the forward path 155 of the communication network. Forward path 155 connects to end user groupings 160, 161, 163 and to end-user device 162. As an example, grouping 160 contains end user devices 1, 2, 57 which are unique to Region 1; the forward path to this grouping could be via MediaFLO, for example. In grouping 161, Region N's end user devices 2-10 and 15, 18, 105 might be connected via forward path 155 as a WiFi architecture. In Region 2, the listed end user devices could be connected via forward path 155 as a DVB-H signal. The Single Device 162 may be in a very remote area, so it uses a mobile satellite to receive forward path 155.

Cellular Network Implementation

FIG. 1C illustrates one embodiment of a physical implementation of the system of FIGS. 1A and 1B. In FIG. 1C, a cellular network is depicted, but other network architectures are capable of realizing Reverse Path Communication System functionality. Of note, certain cellular building blocks are not shown for concept clarity; the devices not shown include but are not limited to: Home Location Register (HLR), Visitor Location Register (VLR), Mobile Switching Center (MSC), Packet Data Switch Network (PDSN), and so on. The function and interconnection of these devices is well known in the art.

Radio Network Sub-System 182 and Radio Network Sub-System 183 are shown, and each Radio Network Sub-System serves a unique geographic region. Cell site 198 serves end user devices 189 through 190, and cell site 199 serves end user devices 194 through 195. Cell site 198 could be omni-directional in its coverage extent, while cell site 199 could be sectorized in its coverage. Further, end user devices 189-190 are grouped together because they are receiving a common multicast from Radio Network Sub-System 182 via cell site 198 along RF forward path 186. Likewise, end user devices 194-195 are receiving a common multicast from sectorized cell site 199 via RF forward path 191. However, on the reverse RF path, end user device 189 communicates via RF pathway 187, while end user device 190 communicates on the reverse path via RF pathway 188; and end user device 194 communicates on reverse path 192, while end user device 195 communicates via reverse path 191.

In a process well understood in the art, a mobile device (end user device) could move from sectorized cell site 199 to omni-directional cell site 198 and retain seamless coverage via the handoff or handover process. Handoffs can be hard, meaning the previous signal is dropped before the new signal is acquired, or they can be soft, where both cell sites 198 and 199 would have communication for a period of time until the handoff is completed. Separately, within the sectored cell site 199, a "softer" handoff process can occur wherein the end user device operates on two adjacent coverage sectors of cell site 199 at the same time.

To initiate a forward path modification sequence, a content modification signal is sent across the physical network. Tracing the path of one example reverse path signal, end user device 189 would communicate via reverse path 187 to cell site 198, which then communicates with Radio Network Sub-System 182. End user device 182 then communicates with data switch/router 180 to the network 181. Network 181 contains all the typical networking formats to include Public Telephone Switched Network (PSTN), Public Switched Data Network (PSDN), and an Internet Protocol Network (IP Network). In addition, while not shown, other protocols that are more suited to a mobile architecture may be deployed.

The network 181 is connected to end user devices 184 and 185 via a more traditional wired paradigm. Reverse Path Communication System 175 is connected to network 181, Reverse Path Communication System 175 receives reverse path modification information from all the then connected end user devices, and processes the data in a manner described herein. The Source Content site 177 delivers content to Reverse Path Communication System 175; content can be multi-media or any other data form that has relevance to the subscriber population or sub-population. After the Reverse Path Communication System has performed its operations, it forwards the modified forward path content back to network 181. Network 181 then communicates to router 180, then radio network subsystem 182 and cell site 198 finally transmit the modified forward path content via RF path 186 to end user devices 189-190, respectively. This process repeats in a cyclical fashion, starting with reverse path modification information to the Reverse Path Communication System 175, which then modifies the forward path content on a frame-by-frame basis if video, and then back to the end user devices.

Gaming Representative Architecture

FIG. 2 illustrates, in broad perspective macro block diagram form, how a typical gaming application might be architected. For this description, the card game of blackjack gambling is used; however, nothing in this example description limits the applicability of the described concepts to other applications with similar attributes.

At Reverse Path Communication System 201, the reverse path feedback data is aggregated from reverse path 240. The data coming into Reverse Path Communication System 201 originates from end user devices located on the right side of FIG. 2, shown as squares with alpha or number designators (to be discussed more later in this section). This feedback data could be instructions such as: "I'll take another card" or "I want to double down" or "I fold and am out for this game only" or "I am done playing entirely". For blackjack, the "dealer" is a software application residing as an external network connected device 202, called Application. This software application 202 responds to the feedback data collected by Reverse Path Communication System 201 and then creates and provides modified content via connection 205 to forward paths 210, 212, and 214. Likewise, any other application, be it multi-player gaming or the like, would operate in a similar fashion.

Nothing herein limits what form forward paths 1, 2, and N, respectively 210, 212, and 214, take. Thus, forward path 210 could be WiFi, forward path 212 could be MediaFLO, and forward path 214 could be cellular, each of which comprise an air interface for the forward path. Forward paths 210, 212, and 214 can also be characterized as a physical delivery region, or could be characterized as a combined physical and logical delivery region/method, respectively, or just a logical delivery method. If forward paths 210, 212, and 214 are logical delivery paths, then the delivery methodology is related to pairing of end users with a given forward path's content, where the end users have like interests independent of physical location. The actual physical delivery regions of these forward paths could be highly varied and diverse. For example, forward path 210 may just be a single narrowcast to a neighborhood in a city on a Caribbean island where electronic gambling is legal. In contrast, forward path 212 could be to all the major gambling areas in the world. For forward path 212, since it is covering so many diverse geographic regions, the air interface of the forward path, be it DVB-H, or MediaFLO, can vary; and nothing herein limits what method is used to deliver the reverse path modified content on the forward path. Finally, forward path 214 might be to all college campuses in the state of Nevada that have more than 2000 students.

The modified forward path content is sent via connection 220 which, as already discussed, could take the form of a variety of wireless air interfaces. The Population 230 comprises the complete set of then connected Players or End Users and their associated End User Devices. Within this Population 230 of the then connected end user devices, Sub-Populations 231-233 are present. These Sub-Populations 231-233 may be geographically concentrated to enable an efficient forward path multicast, narrowcast, or broadcast delivery; or these Sub-Populations 231-233 may be defined as the set of all Players or End users that are blackjack aficionados (i.e., a logical grouping). Again, this latter description is more logical in its extent. Thus, Sub-Populations 231-233 may be logically based on demographics, for example, physically based on location, or the Sub-Populations 231-233 could be a combination of each "grouping methodology". For instance, in Sub-Population 231, end user devices A and B may be in the same geographic region as end user devices M and N in Sub-Population 232, and so a single physical air interface narrowcast (WiMax, for example), is set up to deliver the modified forward path content to end user devices A, B, M, and N, since they are geographically close or in some air interface proximity to each other and within the coverage region of the WiMax cell.

Alternatively, Sub-Populations 231-233 could all be geographically defined, and the logical grouping of those end users interested in blackjack has already been defined by the system. In this case, three multicasts would be set up to deliver modified forward path content to these three geographic regions. Individual Users having end user devices 234, 235, 236, and 237, the Nth device, would each have their own physical air interface connection to the modified forward path content.

In aggregate, the entire Set or Population 230, in some pre-specified timeframe, provides feedback via reverse path 240 to Gaming System with Reverse Path Feedback 201, all in a continuous fashion until a given blackjack game is complete, when a new game is started, or when the scheduled time for blackjack is over, for example.

Logical Architectures

Figure 3:
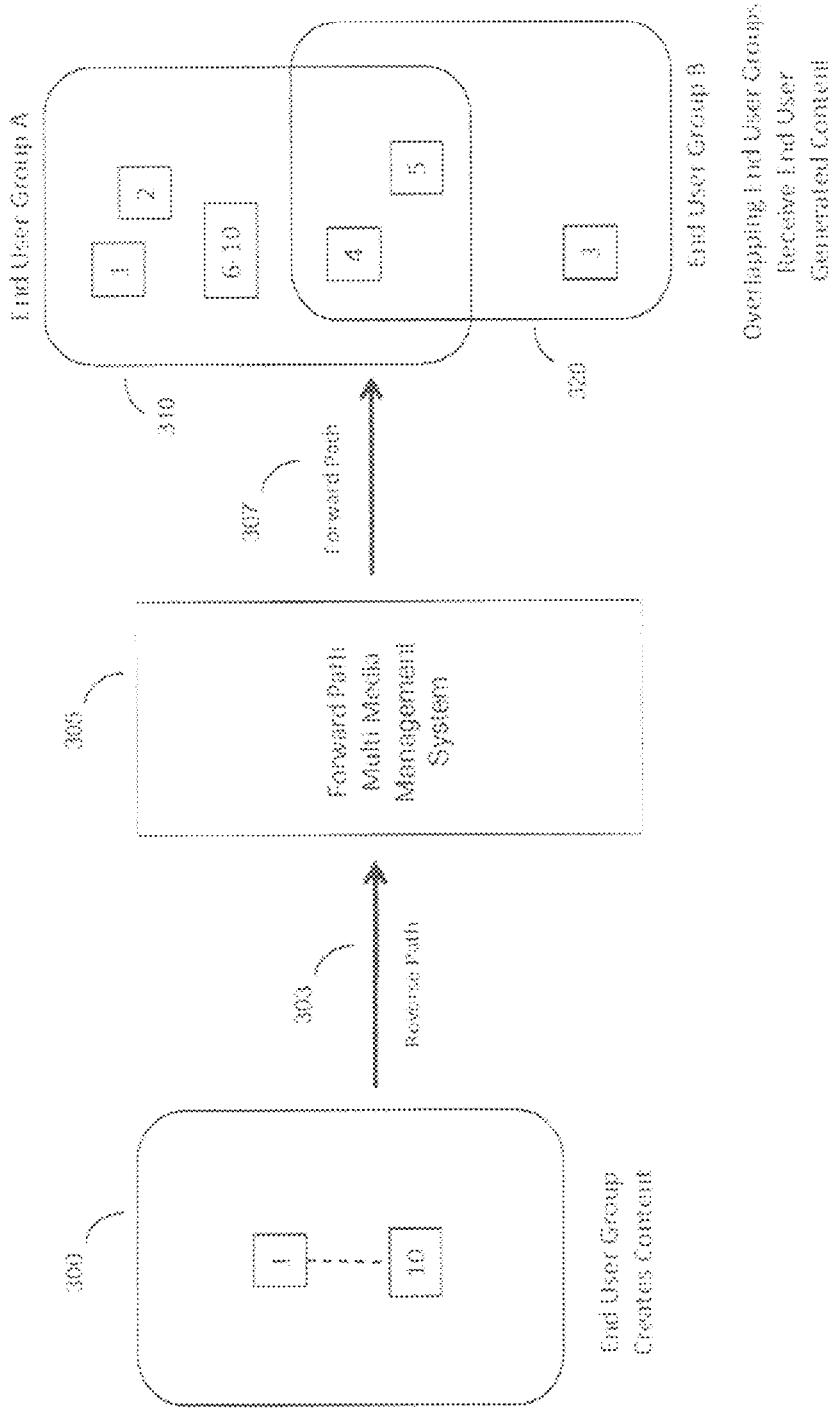
FIG. 3 illustrates, in block diagram form, overlapping user groups.

In FIG. 3, content sources 1-10 individually and in aggregate create content which is supplied to the network. Content sources 1-10 then are connected via conductors 303, which could be wired or wireless in its extent, to Reverse Path Communication System 305. Reverse Path Communication System 305 aggregates the content from content sources 1-10, as applicable, and then applies this data to the Application, for this example residing within Reverse Path Communication System 305. The Application at Reverse Path Communication System 305 then provides input to modify the streamed forward path content to update the end user devices in a continuous fashion, via wireless forward path 307, as a preferred embodiment already described herein. The delivery of the modified forward path content is sent to, in this example, sub-populations 310 and 320. These sub-populations in this particular example are geographic in their extent; that is, the end user devices are within the geographic region of a common shared forward path. Thus, in this embodiment, the chain of communication and content conveyance initially derives from end users that are logically grouped to end users that are now geographically grouped. While the description heretofore has described a logical to physical grouping, there is nothing herein that limits other types of grouping pairs such as: logical to logical groupings, physical to physical groupings, or physical to logical groupings.

At the content source origination point 300, with central content sources 1-10, the conveyed content the is collectively aggregated and processed at Reverse Path Communication System 305 according to the application residing at Reverse Path Communication System 305, and then delivered back to these same end user devices, wherein the forward path 307 content has been modified based on end user input(s). Thus, at delivery region 310, in this example, end user devices 1, 2, and 6-10 are all physically proximate within a given multicast, narrowcast, or broadcast region of the given forward path 307 for that geographic region and share a common air interface or channel which coveys modified forward path content to the end user devices.

Likewise, in delivery region 320, end user device 3 is wholly and uniquely served by forward path multicast delivery region 320. However, end user devices 4-5 can receive the modified forward path from either delivery region 310 or 320. More importantly, it may not be an either/or reception decision from the end users perspective, that is to select just delivery region 310 or just delivery region 320. In fact, the reception could be in soft or softer handoff, wherein wirelessly conveyed information is received and combined in a known fashion from both delivery regions 310 and 320 (this is typically a CDMA architecture which more easily enables the best path selection of N&M paths on a bit-by-bit basis and outputs a more error free data stream than if just N or M were singly selected).

In FIG. 4, a second set of content sources 420 is added; however, nothing herein limits the number of User Groups supplying forward path modification information (via the reverse path). Content source group 1 has content sources 10-15. Content source group 2, in a similar fashion, has content sources 32-39. In aggregate, content sources 10-15 and 32-39 create and communicate content via reverse paths 415 and 425, respectively. The form of the conveyed reverse path data could be original pictures, video, and/or music created by the end user or end user devices; or it could be forward path modification data such as in a gaming, gambling, or hazmat application. Thus, there is nothing that limits what is conveyed on the two reverse paths 415 and 425. Reverse paths 415 and 425 could themselves be shared in some air interface, such as in the time domain or code domain, where a given frequency allocation is fixed; the sharing could be multi-frequency such as in frequency hopped spread spectrum; or the reverse path could be of the wired form, or a combination of wired and wireless. The reverse path may be unique to some or all the end user devices, such as in a circuit switched connection. Last, the reverse path could be packet switched in nature. Thus, the access method (TDMA, CDMA, and the like) the modulation (PSK, QAM, and the like) the frequency, or wired vs. wireless is not a limitation of this invention. Generic reverse paths 415 and 425 connect to the Reverse Path Communication System 430.

An example of the dynamic grouping of end used devices is a traffic reporting and management process 145, where the vehicles at, near and/or approaching a traffic accident or congestion site are grouped based on their physical location. Each vehicle (end-user devices A-F in Sub Group 1 on FIG. 2) transmits status information to the Reverse Path Communication System 118, where the traffic reporting process 145 evaluates the data contained in the status information transmitted by the vehicles to determine which data is most relevant to the reports that are being transmitted to the collected end-user devices. Thus, the vehicles proximate to the accident or congestion site are likely to have their feedback weighed heavier than the data received from vehicles that are further away. In addition, the dynamic grouping of vehicles can be done as a function of the significance of the status information received from the vehicles.

In FIG. 4, forward paths 440, 441, and 442, in this example, are all shared and are wireless in nature. The wireless forward paths are architecture, modulation, access, and frequency independent. Thus, forward paths 440, 441, and 442 could all be the same architecture, or they could be different architectures; the selected architecture or architectures for forward paths 440, 441, and 112 may be geographically static or they could move or morph as the population or sub-population of end users or end user devices moves. These forward paths could be WiFi, WiMax, MediaFLO, DVB-H, cellular, satellite, Sirius Radio, XM Radio, or some other type of architecture that enables sharing of the forward path to given groupings of end users. In this example, the content sources previously discussed, 10-15 and 32-39, are formed into two logical groupings comprising three forward path physical delivery regions. End User Group D is receiving one content stream via forward paths 440 and 441. End User Group C is receiving content via forward paths 441 and 442.

In End User Group D, end user devices 32 and 39, along with end user devices 10-12 and end user device 38, are all receiving the same multicasted content via forward paths 440 and 441, respectively. That is, shared forward path 440 serves end users 32 and 39, while shared forward path 441 serves end users 10-12 and end user 38, each path conveying like content to these end users.

Shared forward path 441 is also used to convey a second set of content to End User Group C. In this example, end users 10-12 and end user 38 are receiving two sets of forward path content via forward path 441, one set for End User Group D and the other set for End User Group C. Thus, it is possible to have overlapping forward path logical delivery regions by logical addressing of delivery where a given shared forward path is conveying different sets of content over the same air interface to a shared physical delivery region.

End user devices 13-15 and 33-37 are served via shared forward path 442 via a wireless means. While the preferred forward path is wireless, since it can be shared, thereby increasing network efficiency and minimizing delivery cost, it is possible to have forward path 442 be a wired Internet Protocol (IP) where a packet switched architecture conveys the content to the end user devices via a more traditional wired means (where wired could be copper cable, DSL, cable modem, fiber optic, or other such means).

Reverse Packet Timing

FIG. 5 illustrates, in block diagram form, the time alignment of reverse path data to ensure forward path modification accuracy. In FIG. 5, for most applications, it is important to time align the reverse path packet set 510 comprising packet streams from end user devices 1-N. This is true for applications such as gaming, where the players' data needs to be aggregated, again within some time window as noted above; otherwise, the modified forward path content appears out of context or nonsensical. FIG. 5 illustrates the functional operation of a Gaming System With End User Feedback 520 to address the packet timing issue.

Gaming System With End User Feedback 520 includes a data buffer 521, located in the feedback aggregator 120, which stores the received reverse path end user feedback packets until they can be time sequence ordered by a timing processor 522 in the content processor 130 (within some time window), and then forwarded to the delivery networks via content integrator 140. Reverse path packets that arrive outside of the time window for aggregation would be discarded or delayed for use in the successive time interval, based on the operation of the multi-player gaming application 141. Thus, a blackjack player can wager only when it is their turn to wager and can play and receive cards only when it is their turn to play. If a player attempts to wager or play cards out of turn, their input will be discarded in order to maintain the integrity of the game.

Furthermore, when the player plays or receives cards, the displays must account for these changes. In the instance where the cards are played face up, the display transmitted via the unidirectional forward path to all the players is updated. In the case where face down cards are received by a player, the player must receive a display of their new cards, but the other players must not be able to see the face down cards. Thus, the forward path of the bidirectional link 170 can be used to transmit a display update to the player's associated end user device to show only the player their face down cards, such as in a split screen display. This private data can also be transmitted to the player via the unidirectional forward path 155 as an in-band encrypted data stream, which only the one player can decrypt using their personal decryption key. Thus, multiple private data transmissions can be included in the unidirectional forward path 155 transmission if they are time-interleaved and encrypted.

Process For Modifying The Forward Path

In FIG. 6, a typical process for modifying the content that is transmitted on the forward path is described. This is merely one of a number of methods to modify the content that is transmitted on the forward path and is not meant to be the only means for such forward path modification.

At step 610, the entire population of then connected end user devices is shown. The Reverse Path Communication System is not limited to where the end user devices are physically located. End User Device 1 (611), along with End User Device 2 (612) and End User Device "N" (613), respond to the most recent forward path content, such as the display on a hand-held video game, and initiate a reverse path communication via their end user device at step 620, such as how to move their avatar in an action game. At step 630, the Reverse Path Communication System receives and processes the reverse path inputs from the then connected end user devices. Step 630 would also implement the steps of FIG. 5 to insure time coherency in the aggregated responses.

At step 640, the forward path content, still to be delivered back to the connected end user population, is modified. Thus, in this gaming application, the next frame (or number of frames) of the game is modified based on the collectively aggregated reverse path inputs. At step 650, the game video and audio is delivered via a shared forward path. The delivery can be via physical grouping, logical grouping, or a combination of the two forms of grouping. At step 655, the game video and audio is delivered via a one-to-one communication means, either wired or wireless.

At step 660, the feedback loop starts again where the end users via their end user devices begin to respond to the new video and audio being displayed on their end user devices. Step 660 connects to step 630 in a continuous fashion until the game is complete or some other decision for game termination is realized, such as a time or date. In addition, at step 670, the end user feedback can be destined for selected ones of the other players in the multi-player game so a player can team with other players in a personal end user device to end user device communication link over the bidirectional links.

End User Device

FIG. 7 depicts a block diagram of one embodiment of an end user device. This particular embodiment of end user device 800 has multiple means to communicate, as well as numerous means to provide input to ultimately modify the forward path. The description of this device is likely more encompassing than would be for a typical end user device. The description contained herein is meant to show what is possible.

End user device 800 is capable of receiving content multicasts, broadcasts, or narrowcasts on the forward path. End user device 800, either in an autonomous mode or via end user action, then is capable of communicating, in the reverse path direction, end user initiated content which could be complete in its nature; or it could be used (in aggregate) to modify the next few frames of a video game, for instance, after processing by the Reverse Path Communication System.

The central portion of end user device 800 is baseband and RF processor 810 which also contains an application processor with associated software/firmware. Baseband and RF processor 810 manages the operation of end user device 800 by collecting inputs from input devices 830-835 and 850, communicating via devices 801 through 806, and outputting content, information, and data via devices 814-816. Baseband and RF processor 810 contains typical elements, such as a microprocessor with associated memory and firmware, as well as loadable software. Input devices 830-835 are internally connected to relevant internal components via internal local network 851. They communicate directly with baseband and RF processor 810.

Device 830 is a motion sensor which could be used for gaming. This device has sensors for acceleration and/or motion; the data collected could be relative or absolute. Device 831 is an electronic cash account which provides for a secure means to store cash or cash equivalents on end user device 800 to include a means to send or receive cash or cash equivalents. The electronic cash account could be used to pay for accessing forward path modified content. This sub-device could also be an electronic credit card or some other electronic payment means like PayPal™.

Device 833 is a digital camera. Device 834 is a digital video camera. Device 835 is a microphone for audio input. Again, as previously described, all of the input sub-devices 830-835 are internally connected within end user device 800 via local network 851; sub-devices 830-835 also receive power and other signaling via 840, battery/buss. Device 850 is a keypad or touch-screen. This is an input device connected to internal network 851. Communication devices 801-806 are generally wireless in nature, but communication device 806 could be wired. As previously discussed, most end user devices would not have this many methods to communicate; rather, the end user device would have a subset of the means listed herein.

Device 801 is typically a satellite receiver for a data service from a high powered satellite such as Sirius Radio or XM Radio. It could also be future satellites such as those from Mobile Satellite Ventures (MSV). The advantage of satellite signals is that they can cover a very large geographic area for conveying the modified forward path. For Mobile Satellite Ventures, their architecture intends to use spot beams, albeit still covering a relatively large geographic area. Device 801 could also be a bi-directional satellite transceiver, meaning it could also transmit as well as receive from satellites.

Device 802 is a cellular transceiver. It could be multi-frequency mode, multi-access mode (GSM and CDMA), or it could be multi-air interface protocol, such as 1xRTT and EVDO. Device 803 is a WiFi transceiver generally conforming to the "802" standards. Device 804 is a WiMax transceiver. WiMax networks are being deployed as of this filing and offer the advantage of wider area coverage(longer link distances) than does WiFi, which generally is considered and used for shorter distance communications. For either WiFi or WiMax, the communication is typically packet switched and uses versions of the IP protocol, albeit wirelessly. Device 805 is a very short range Bluetooth transceiver. Device 806 is some other communication means to include wired communications.

The output devices of end user device 800 are 814-816. Device 814 is a motion output device. This could be a shaker or something more sophisticated, such as that in the Wii™ video game controller. It is designed to provide physical, sensory feedback to the end user or end user device. Device 815 is a video display. The display is likely digital in nature and would provide a high resolution (a large number of pixels) image capable of displaying images, video, games, and the like. It is anticipated that end user device 800 could also communicate an image, video, or visual information via a short range means such as Bluetooth to a remote monitor or display. Device 816 is for audio output. It could be via speakers mounted on the end user device, via wired or wirelessly connected headphones, or via a Bluetooth connection to a remote sound system, for example.

As part of the content delivery, the system can deliver Augmented Reality (AR) which is a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented) by a computer. As a result, the technology functions by enhancing one's current perception of reality. By contrast, virtual reality replaces the real world with a simulated one. Augmentation is conventionally in real-time and in semantic context with environmental elements, such as sports scores on TV during a match. With the help of advanced AR technology (e.g. adding computer vision and object recognition) the information about the surrounding real world of the user becomes interactive and digitally manipulable. Information about the environment and its objects is overlaid on the real world. This information can be virtual or real, e.g. seeing other real sensed or measured information such as electromagnetic radio waves overlaid in exact alignment with where they actually are in space.

A head-mounted display (HMD) is a display device paired to a headset such as a harness or helmet. HMDs place images of both the physical world and virtual objects over the user's field of view. Modern HMDs often employ sensors for six degrees of freedom monitoring that allow the system to align virtual information to the physical world and adjust accordingly with the user's head movements. HMDs can provide users immersive, mobile and collaborative AR experiences. Near eye augmented reality devices can be used as portable head-up displays as they can show data, information, and images while the user views the real world. Many definitions of augmented reality only define it as overlaying the information. This is basically what a head-up display does; however, practically speaking, augmented reality is expected to include tracking between the superimposed information, data, and images and some portion of the real world.

Spatial Augmented Reality

Spatial Augmented Reality (SAR) augments real world objects and scenes without the use of special displays such as monitors, head mounted displays or hand-held devices. SAR makes use of digital projectors to display graphical information onto physical objects. The key difference in SAR is that the display is separated from the users of the system. Because the displays are not associated with each user, SAR scales naturally up to groups of users, thus allowing for collocated collaboration between users.

Examples include shader lamps, mobile projectors, virtual tables, and smart projectors. Shader lamps mimic and augment reality by projecting imagery onto neutral objects, providing the opportunity to enhance the object's appearance with materials of a simple unit—a projector, camera, and sensor.

Other applications include table and wall projections. One innovation, the Extended Virtual Table, separates the virtual from the real by including beam-splitter mirrors attached to the ceiling at an adjustable angle. Virtual showcases, which employ beam-splitter mirrors together with multiple graphics displays, provide an interactive means of simultaneously engaging with the virtual and the real. Many more implementations and configurations make spatial augmented reality display an increasingly attractive interactive alternative.

A SAR system can display on any number of surfaces of an indoor setting at once. SAR supports both a graphical visualisation and passive haptic sensation for the end users. Users are able to touch physical objects in a process that provides passive haptic sensation.

Tracking

Modern mobile augmented reality systems use one or more of the following tracking technologies: digital cameras and/or other optical sensors, accelerometers, GPS, gyroscopes, solid state compasses, RFID and wireless sensors. These technologies offer varying levels of accuracy and precision. Most important is the position and orientation of the user's head. Tracking the user's hand(s) or a handheld input device can provide a 6DOF interaction technique.

Virtual reality or virtual realities (VR), which can be referred to as immersive multimedia or computer-simulated reality, replicates an environment that simulates a physical presence in places in the real world or an imagined world, allowing the user to interact with that world. Virtual realities artificially create sensory experience, which can include sight, touch, hearing, and smell.

Most up-to-date virtual realities are displayed either on a computer screen or with an HD VR special stereoscopic displays, and some simulations include additional sensory information and focus on real sound through speakers or headphones targeted towards VR users. Some advanced haptic systems now include tactile information, generally known as force feedback in medical, gaming and military applications. Furthermore, virtual reality covers remote communication environments which provide virtual presence of users with the concepts of telepresence and telexistence or a virtual artifact (VA) either through the use of standard input devices such as a keyboard and mouse, or through multimodal devices such as a wired glove or omnidirectional treadmills. The immersive environment can be similar to the real world in order to create a lifelike experience—for example, in simulations for pilot or combat training—or it can differ significantly from reality, such as in YR games.

Modified Multi-Media Content

FIG. 8 is a representative flowchart for modifying multimedia content. At step 910, the reverse path inputs from the then connected end users are aggregated in a fashion already described herein. At step 920, individual frames of the visual content are modified; and at step 930, the aural information is also modified. At step 940, in a time synchronous fashion, the visual and aural information is re-integrated. Step 950 determines if there is enough modified content to send via the forward path. If there is sufficient modified forward path data, at step 960, the modified content is sent via a shared forward path. However, at step 950, if sufficient frames are not ready to be sent, step 950 buffers the completed modified frames and then returns to the process flow back to step 910 to create more modified frames until such time as there are sufficient frames to send, application determinate.

SUMMARY

The Reverse Path Communication System architecture enables end user devices to share a common wireless forward path of a multicast communication architecture in which the forward path delivered content is dynamically changed or modified based on a real-time, near-real-time, or delay-time basis via aggregated reverse path feedback from at least one of a plurality of end user devices. The Reverse Path Communication System periodically or continuously aggregates the feedback inputs received via the reverse path (having wired and/or wireless connectivity), modifies the forward path multi-media content, and delivers this dynamically modified multi-media content to the then connected population of end user devices via a wireless forward path multicast, in a repetitive closed loop fashion.

What is claimed:

1. A Reverse Path Communication System, operational in a wireless communication network which serves a plurality of wireless end user devices comprising:
    a content distribution server, connected to a multi-casting wireless network that serves a plurality of wireless end user devices, for simultaneously transmitting a stream of content frames received from a content source to a plurality of wireless end user devices, comprising a set of selected ones of wireless end user devices, over a single unidirectional forward broadcast path of the multi-casting network that extends from the content distribution server to the selected wireless end user devices;
    a private reverse path, concurrently operational with the unidirectional forward broadcast path, for transmitting end user input data received from the at least one of the selected ones of the wireless end user devices in response to the stream of content frames transmitted over the unidirectional forward broadcast path;
    wherein the content distribution server comprises:
    a feedback aggregator for receiving end user input data received from the set of selected ones of wireless end user devices and routing the end user input data to one of an external destination and a content processor for identifying modifications to the stream of content frames corresponding to the aggregated end user input data, comprising:
    a timing synchronizer for defining a time period for use by the feedback synchronizer during which time period the end user input data received from the end users is associated with at least one of the present frames of the stream of content frames stored in the buffer,
    an accumulated feedback data processor for processing the accumulated end user input data received from the end users to a composite content revision for stream of content frames, and
        a content integrator, responsive to identified modifications to the stream of content frames corresponding to the aggregated end user input data, for dynamically modifying the stream of content frames yet to be transmitted to the set of selected ones of wireless end user devices and transmitting the modified the stream of content frames to the set of selected ones of wireless end user devices.

2. The Reverse Path Communication System of claim 1 wherein the content distribution server further comprises:
    a feedback synchronizer for associating the end user input data received from the end users with corresponding stream of content frames.

3. The Reverse Path Communication System of claim 1 further comprising:
    a content feedback generator for transmitting end user input data, associated with corresponding stream of content frames, to a central content source that is generating the corresponding stream of content frames via a path that extends from the communication network to the central content source.

4. A method of operating a Reverse Path Communication System, operational in a wireless communication network which serves a plurality of wireless end user devices comprising:
    simultaneously transmitting from a content distribution server, connected to a multi-casting wireless network that serves a plurality of wireless end user devices, a stream of content frames received from a content source to a plurality of wireless end user devices, comprising a set of selected ones of wireless end user devices, over a single unidirectional forward broadcast path of the multi-casting network that extends from the content distribution server to the selected wireless end user devices;
    transmitting over a private reverse path, concurrently operational with the unidirectional forward broadcast path, end user input data received from the at least one of the selected ones of the wireless end user devices in response to the stream of content frames transmitted over the unidirectional forward broadcast path;
    wherein the step of simultaneously transmitting comprises:
    receiving end user input data received from the set of selected ones of wireless end user devices and routing the end user input data to one of an external destination and a content processor for identifying modifications to the stream of content frames corresponding to the aggregated end user input data, comprising
    defining a time period for use by the feedback synchronizer during which time period the end user input data received from the end users is associated with at least one of the present frames of the stream of content frames stored in the buffer,
    processing the accumulated end user input data received from the end users to a composite content revision for stream of content frames, and
    dynamically modifying, in response to identified modifications to the stream of content frames corresponding to the aggregated end user input data, the stream of content frames yet to be transmitted to the set of selected ones of wireless end user devices and transmitting the modified the stream of content frames to the set of selected ones of wireless end user devices.

5. The method of operating a Reverse Path Communication System of claim 4 wherein the step of simultaneously transmitting further comprises:
    associating the end user input data received from the end users with corresponding stream of content frames.

6. The method of operating a Reverse Path Communication System of claim 4 further comprising:
    transmitting end user input data, associated with corresponding stream of content frames, to a central content source that is generating the corresponding stream of content frames via a path that extends from the communication network to the central content source.

* * * * *